Nov. 1, 1966 K. STEINER 3,282,299
CONTROL SYSTEM FOR SLIDABLE GATES IN GAS PIPES
Filed Dec. 22, 1964 2 Sheets-Sheet 1
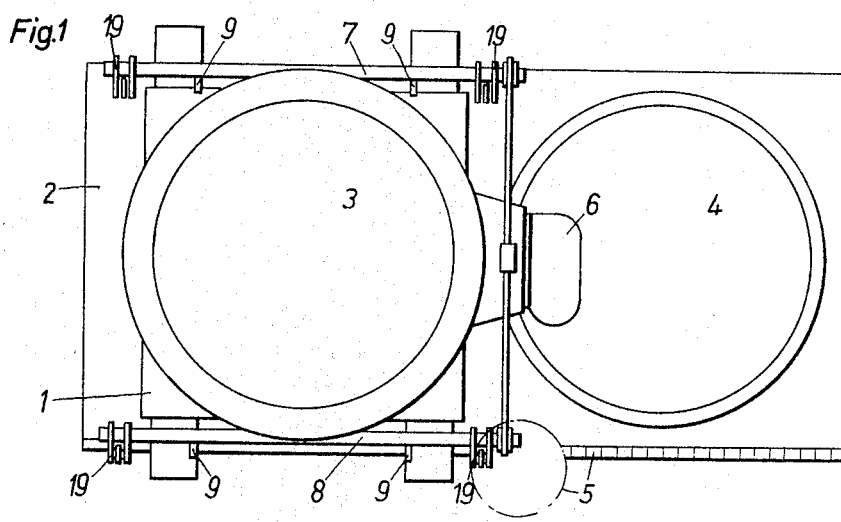
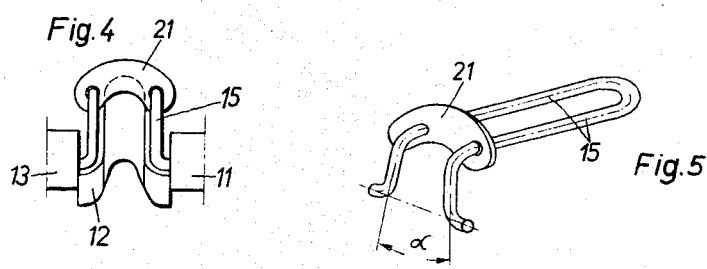
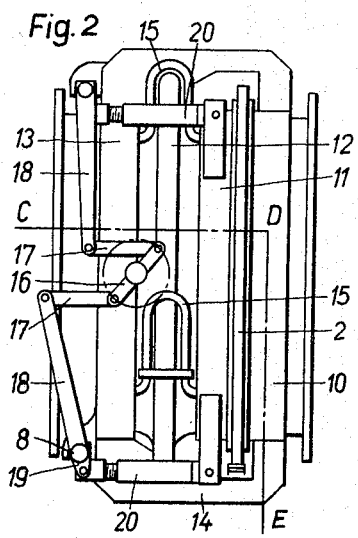
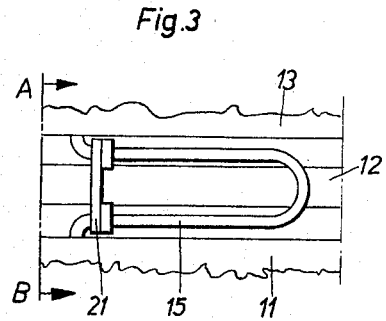
Inventor:
KARL STEINER
by: Ernest F. Marmorek
Atty.

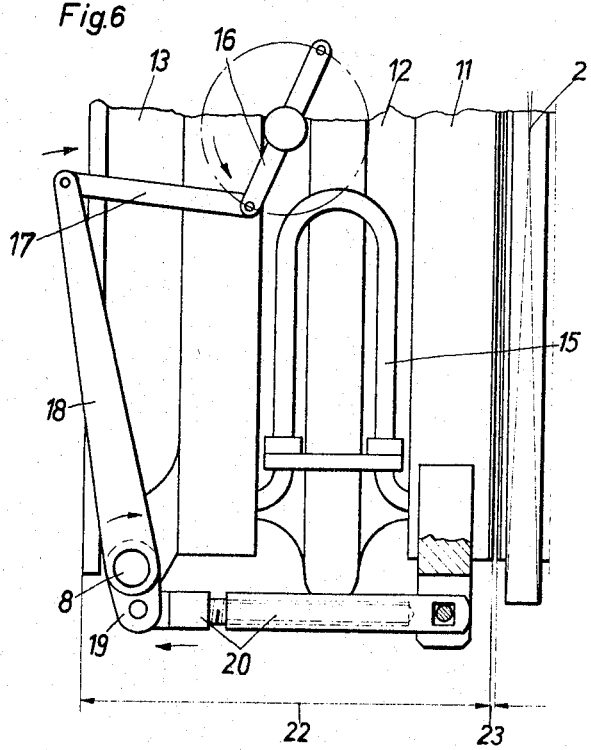
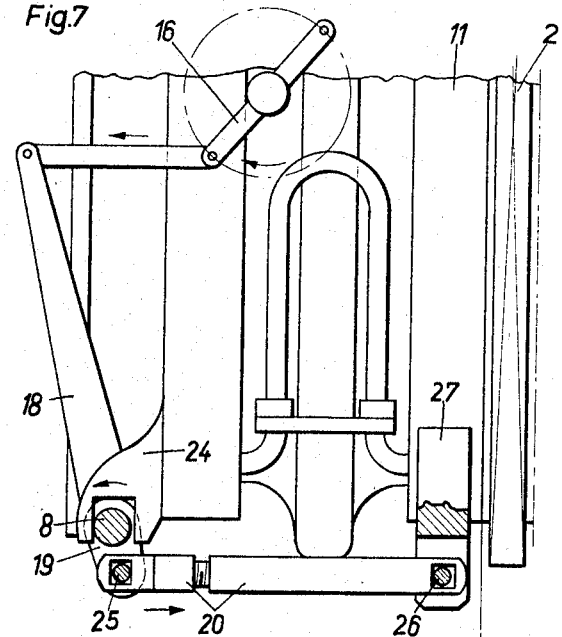
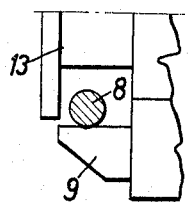

United States Patent Office 3,282,299
Patented Nov. 1, 1966

3,282,299
CONTROL SYSTEM FOR SLIDABLE GATES
IN GAS PIPES
Karl Steiner, Homburg-Bruchhof, Germany, assignor to Dinglerwerke Aktiengesellschaft, Zweibrucken, Germany, a corporation of Germany
Filed Dec. 22, 1964, Ser. No. 420,286
Claims priority, application Germany, Dec. 27, 1963, D 43,268
5 Claims. (Cl. 138—94.3)

The invention has for its object a control system for slidable gates in mean and large sized gas pipes. Since slidable gates are advantageously used in metallurgical works for pipes subjected to large deposits of dust and to generally high temperatures, their control system must always be ready for operation and its structure should be simple and allow an easy service.

The improved control system, executed according to the invention is constituted by a casing including three sections of which the middle section is connected with the expansion joint or compensator and is axially shiftable therewith so as to compress and release the shiftable gate that comprises a solid and an open portion. This shifting is performed by means of eccentric members operating through a linkwork at several points or by means of threaded rods. The latter are controlled by cable-engaging pulleys and connecting rods and are carried at the periphery of the casing.

The urging of the gate into position by the movable middle section of the gate casing is ensured by a plurality of torsion springs. By reason of their particular shape, the latter engage longitudinally the compensator in close relationship therewith and include an arcuate part passing over the medial incurved section of the compensator to engage the latter tightly in a manner such that the pressure of the springs acts energetically on the surface to be fluidtightly sealed on the sealing strips of the shiftable gate, in a direction parallel with the pipe axis along the peripheries of the compensator to either side of the latter.

According to a further development of the invention, the elastic pressure exerted by the torsion springs on the surfaces of the sealing strips is associated with a special adjustable link system which is shifted by a closed, self-locking mechanism actuated by power or manually. This link system includes two main control shafts, eccentrically carried, double levers and further connecting members. The shafts and associated connecting parts are not carried in conventional smooth or roller bearings and in contradistinction, when the link system is actuated, they roll under pressure on hardened surfaces in square recesses or bores in the connecting members. This is the case for those parts which are subjected to a larger pressure, while on the contrary the parts subjected to a lesser pressure show elongated slots inside which the connecting parts of a somewhat small diameter are engaged and can follow the angular movements of the link system without any attendance or lubrication being required.

The torsion springs of a simple structure are wholly insensitive with reference to deposits of dirt and the same is true for the entire link system. Neither the springs nor the links are subjected thereby to the action of the high temperatures appearing during operation, since these parts lie outside the compensator. This cuts out the use of large flanges and brackets for discharge purposes.

A withdrawal of the middle section of the casing with reference to the shiftable gate in order to release the latter with a view to shifting it, is performed solely through the special link system which alone has to overcome the force exerted by the torsion springs. The movements of the levers correspond then to those executed for pressing the gate into position and differ only through the fact that they are executed partly in the opposite direction. No attendance is required, any more than for said pressing in position, for the different parts moving under pressure.

When the control system for a shiftable gate, executed in accordance with the invention, is positioned normally in a vertical plane in a horizontal extending pipe so that the gate may be shifted from left to right or reversely, the control shafts and the longitudinally adjustable control levers of the link system rest loosely under the action of their own weight on ledges or else are carried loosely by corresponding connecting parts so that it is possible at any moment to actuate freely the link system.

If the control system for the shiftable gate is fitted obliquely, auxiliary elastic or the like means are provided so that in their inoperative position the above referred to parts of the link system are located in the same manner at the start as that described hereinabove. The shiftable gate and control system according to the invention may thus be fitted in any position for use.

The accompanying drawings illustrate by way of example a preferred embodiment of the invention. In said drawings:

FIG. 1 is an elevational view of the shiftable gate control system, the gate being in its outwardly shifted position, FIG. 2 is a side view of the gate control system shown in FIG. 1, FIG. 3 is a view from above of the torsion springs inserted in the control system, FIG. 4 is a view of the torsion springs shown in FIG. 3 as seen in the direction AB, FIG. 5 is a perspective view of a torsion spring, FIGS. 6 and 7 illustrate cross-sectionally two different positions assumed by the lever system, the cross-section following the line C–D–E of FIG. 2, FIG. 8 illustrates a detail taken out of FIGS. 6 and 7.

The casing 1 for the shiftable gate control system illustrated in FIG. 1 includes several sections and carries the shiftable gate 2 including a solid gate section 3. The open gate section 4 is shown as urged outwardly by the toothed rack control mechanism 5. The control mechanism 6 drives through connecting rods, the upper control shaft 7 and the lower control shaft 8. Said shafts rest in their inoperative starting position on the sheet metal shelves 9 (FIG. 8).

In front of the stationary casing section 10 (FIG. 2), is located the movable casing section 11 associated with the compensator 12 and the stationary casing section 13. The stationary section of the casings 10 and 13 are rigidly interconnected by the cross-members 14 while the movable section 11 is connected with the stationary section 13 through the torsion springs 15 so as to be subjected to an axial thrust; said springs exert consequently a pressure on the shiftable gate 2 lying between the first mentioned casing sections 10 and 11 so as to urge the sealing surface of said gate onto the sealing fillets of said casing sections. The pressure exerted on the gate is furthered by the lever system 16–20. The free ends of the doublearmed lever 16 carried by the control mechanism 6, are pivotally secured to the connecting levers 17 and 18 connected in their turn with the double levers 19 rigidly keyed to the control shafts 7 and 8 (FIG. 1), said double levers 19 engaging the control rods 20.

FIGS. 3 and 4 illustrate a torsion spring 15 inserted in a tensioned condition between the casing sections 11 and 13, said spring being illustrated in FIG. 5 in its disconnected and released condition. The outwardly bent free ends of the previously tensioned torsion spring extend in parallelism and form, when released, an angle α with each other. The transmission of power to the shanks forming the spring, is obtained through the bridge member 21 fitted over said shanks.

FIG. 6 shows how the casings 11 and 13 urged away from each other against the action of the torsion springs 15 to either side of the compensator 12 are compressed against each other through rotation of the double lever 16 in a counter clockwise direction so that the distance between the casing sections 11 and 13 is measured by the distance 22, leaving an air gap 23 between the shiftable gate 2 and the casing section 11. The casing section 11 is movable with the compensator 12, while the casing section 13 is stationary. The torsion springs 15 tension the casing sections 11 and 13. When the lever 16 is rotated, the casing section 11 will be pressed by the compensator 12 against the casing section 13.

FIG. 7 shows the casing section 11 urged into contact with the shiftable gate 2 under the action of the torsion springs 15 and of the lever system. Upon rotation of the double lever 16 in a clockwise direction, the application of force onto the casing section is obtained through the shafts 7 and 8. The control shafts 7 and 8 run in this case inside the rectangular cuts formed in the carrier members 24 and the connecting pins 25 for the double lever 19 and the connecting pins 26 for the bracket-forming metal sheets 27 run in the rectangular openings formed in the front and rear ends of the control rods 20. One of the control shafts resting, when inoperative, on the coresponding carrier shelves 9, say the shaft 8, as illustrated cross-sectionally in FIG. 8.

What I claim is:

1. In combination with a gas pipe, a gate system including a casing enclosing the pipe at a predetermined location, said casing including two rigidly interconnected outer stationary sections perpendicular to the pipe axis and a medial section adapted to the shifted between said stationary sections in a direction parallel with the axis of the pipe, a gate including an open section and a solid section, adpted to be shifted transversely, said gate being inserted between one stationary section of the casing and the movable section of the casing, and adapted to be shifted between a position for which the open section of the gate registers with the inside of the pipe and a second position for which the solid section of the gate registers with the inside of the gate, packing means inserted between each side of each section of the gate and the cooperating sections of the casing, a compensator carried inside the casing between the medial section and the other stationary section thereof U-shaped torsion springs fitted closely around the periphery of the compensator between said other and medial sections of the casing and urging the medial shiftable section of the casing against the shiftable gate, the pressure exerting surfaces of said springs extending in substantial registry with the packing means provided on either section of the gate registering with the pipe.

2. In combination with a gas pipe, as claimed in claim 1, a self-locking control mechanism fitted on a stationary section of the casing, a link system controlled by said control mechanism and adapted upon rotation of the latter in a predetermined direction to urge the medial section of the casing away from the gate against the action of the springs, and rods extending in parallelism with the pipe axis, controlled by said link system and adapted to urge the movable section of the casing against the gate upon rotation of the control mechanism in the direction opposed to the above-mentioned predetermined direction.

3. In combination with a gas pipe, as claimed in claim 1, a self-locking control mechanism fitted on a stationary section of the casing, a link system controlled by said control mechanism and adapted upon rotation of the latter in a predetermined direction, to urge the medial section of the casing away from the gate, against the action of the springs, controlled shafts controlled by the link system, links rigid with said shafts, brackets rigid with the stationary sections of the casing and over which the shafts are adapted to slide to a reduced extent, rods controlled by said links, members rigid with the movable section of the casing and engaged with a clearance by said rods to be controlled by the latter to thereby ensure a shifting of the movable section of the casing into engagement with the gate upon rotation of the control mechanism in the direction opposed to said predetermined direction.

4. In combination with a horizontal gas pipe, a gate system including a casing enclosing the pipe at a predetermined location, said casing including two rigidly interconnected outer statonary sections perpendicular to the pipe axis and a medial section adapted to be shifted between said stationary sections in a direction parallel with the axis of the pipe, a gate including an open section and a solid section, said gate being inserted between one stationary section of the casing and the movable section of the casing, and adapted to be shifted between a position for which the open section of the gate registers with the inside of the pipe and a second position for which the solid section of the gate registers with the inside of the gate, packing means inserted between each side of each section of the gate and the cooperating sections of the casing, a compensator carried inside the casing between the medial section and the other stationary section thereof, U-shaped torsion springs fitted closely around the periphery of the compensator between said other and medial sections of the casing and urging the medial shiftable section of the casing against the shiftable gate, the pressure exerting surfaces of said springs extending in substantial registry with the packing means provided on either section of the gate registering with the pipe, a self-locking control mechanism fitted on a stationary section of the casing, a link system controlled by said control mechanism and adapted upon rotation of the latter in a predetermined direction, to urge the medial section of the casing away from the gate, against the action of the springs, controlled shafts controlled by the link system, links rigid with said shafts, horizontal upwardly facing ledges rigid with said other stationary section of the casing and over which the connecting shafts are adapted to slide to a horizontal reduced extent, rods controlled by said links with a horizontal clearance, members rigid with the movable section of the casing and engaged with a clearance by said rods to be controlled by the latter and thereby ensure a shifting of the movable section of the casing into engagement with the gate upon rotation of the control mechanism in the direction opposed to said predetermined direction.

5. In combination with a gas pipe, as claimed in claim 1, a self-locking control mechanism fitted on a stationary section of the casing, a link system controlled by said control mechanism and adapted upon rotation of the latter in a predetermined direction, to urge the medial section of the casing away from the gate, against the action of the springs, controlled shafts controlled by the link system, links rigid with said shafts, horizontal upwardly facing ledges rigid with said other stationary section of the casing and over which the connecting shafts are adapted to slide to a horizontal reduced extent, rods controlled by said links with a horizontal clearance, members rigid with the movable section of the casing and engaged with a clearance by said rods to be controlled by the latter and thereby ensure a shifting of the movable section of the casing into engagement with the gate upon rotation of the control mechanism in the direction opposed to said predetermined direction and the shafts being urged into a predetermined position on their ledges and the rods into a predetermined longitudinal position with reference to the cooperating links and last-mentioned members.

References Cited by the Examiner

UNITED STATES PATENTS

| | | | |
|---|---|---|---|
| 2,702,178 | 2/1955 | Scholl | 138—94.3 |
| 3,047,024 | 7/1962 | Schuller | 138—94.3 |

FOREIGN PATENTS 331,261  6/1930  Great Britain.

LAVERNE D. GEIGER, *Primary Examiner.*

C. HOUCK, *Assistant Examiner.*